United States Patent
Margulis et al.

(10) Patent No.: US 9,780,889 B1
(45) Date of Patent: Oct. 3, 2017

(54) TECHNIQUES FOR RF TRANSCEIVER SELF-CALIBRATION

(71) Applicant: QUALCOMM Incorporated, San Diego, CA (US)

(72) Inventors: Ilya Margulis, Kfar Saba (IL); Ran Iron, Tel Aviv (IL); Yeuda Raz, Hod-Hasharon (IL); Walid Khairy Mohamed Ahmed, Tinton Falls, NJ (US); Guy Wolf, Rosh Haayin (IL); Victor Alexander Abramsky, Edison, NJ (US)

(73) Assignee: QUALCOMM Incorporaeted, San Diego, CA (US)

( * ) Notice: Subject to any disclaimer, the term of this patent is extended or adjusted under 35 U.S.C. 154(b) by 0 days.

(21) Appl. No.: 15/132,950

(22) Filed: Apr. 19, 2016

Related U.S. Application Data

(60) Provisional application No. 62/313,648, filed on Mar. 25, 2016.

(51) Int. Cl.
*H04B 17/11* (2015.01)
*H04W 72/04* (2009.01)
(Continued)

(52) U.S. Cl.
CPC ............... *H04B 17/11* (2015.01); *H04W 8/30* (2013.01); *H04W 24/02* (2013.01); *H04W 56/0035* (2013.01); *H04W 72/0453* (2013.01)

(58) Field of Classification Search
CPC ...... H04B 17/11; H04B 1/0475; H04B 17/14; H04B 17/21; H04B 17/20;
(Continued)

(56) References Cited

U.S. PATENT DOCUMENTS 7,130,359 B2   10/2006  Rahman
7,254,379 B2    8/2007  Xu et al.
(Continued)

FOREIGN PATENT DOCUMENTS

WO    WO-2015/062761 A1    5/2015

OTHER PUBLICATIONS

Nassery A., et al., "Built-In Self-Test of Transmitter I/Q Mismatch and Nonlinearity Using Self-Mixing Envelope Detector," IEEE Transactions on Very Large Scale Integration (VLSI) Systems, Feb. 2015, vol. 23 (2), pp. 331-341.
(Continued)

*Primary Examiner* — Vineeta Panwalkar
(74) *Attorney, Agent, or Firm* — Arent Fox LLP

(57) ABSTRACT

Various aspects described herein relate to calibrating transceiver impairment in wireless communications. Direct current (DC) components of one or more signals can be modified, using one or more configured DC components, for transmitting to a user equipment (UE) via a transmitter. A receiver can receive the one or more signals as transmitted via the transmitter. An impairment of at least one of the transmitter, the receiver, or a combination thereof, can be determined based at least in part on comparing the DC components of the one or more signals as received via the receiver to the one or more configured DC components. One or more components of at least one of the transmitter, the receiver, or a combination thereof can be adjusted to compensate for the impairment.

30 Claims, 10 Drawing Sheets

(51) Int. Cl.
*H04W 24/02* (2009.01)
*H04W 56/00* (2009.01)
*H04W 8/30* (2009.01)

(58) Field of Classification Search
CPC .. H04B 2001/305; H03D 3/008; H03D 3/009; H03D 2200/0045; H03D 2200/0082; H04L 27/364; H04L 2027/0018; H04L 25/061; H04L 27/366; H04W 8/30; H04W 56/0035; H04W 72/0453; H04W 24/02

See application file for complete search history.

(56) References Cited

U.S. PATENT DOCUMENTS

| | | | |
|---|---|---|---|
| 7,369,820 B2 * | 5/2008 | Rahman | H04B 1/0475 375/297 |
| 7,616,929 B2 | 11/2009 | Behzad | |
| 7,688,880 B2 * | 3/2010 | Haub | H04B 1/30 375/148 |
| 7,856,048 B1 | 12/2010 | Smaini et al. | |
| 8,014,444 B1 | 9/2011 | Marino | |
| 8,284,824 B1 | 10/2012 | Smaini et al. | |
| 8,630,598 B2 | 1/2014 | Laroia et al. | |
| 8,792,582 B2 | 7/2014 | Muhammad | |
| 2012/0300818 A1 | 11/2012 | Metreaud et al. | |
| 2015/0118980 A1 | 4/2015 | Leung et al. | |

OTHER PUBLICATIONS

International Search Report and Written Opinion—PCT/US2017/023023—ISA/EPO—dated May 24, 2017. 13 pages.

* cited by examiner

TECHNIQUES FOR RF TRANSCEIVER SELF-CALIBRATION

CLAIM OF PRIORITY UNDER 35 U.S.C. §119

The present Application for Patent claims priority to Provisional Application No. 62/313,648 entitled "TECHNIQUES FOR RF TRANSCEIVER SELF-CALIBRATION" filed Mar. 25, 2016, which is assigned to the assignee hereof and hereby expressly incorporated by reference herein.

INTRODUCTION

Described herein are aspects generally related to communication systems, and more particularly, to calibrating transceivers in wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. The wireless devices typically include a user equipment (UE), such as a mobile device, that communicates with a base station to receive access to a wireless network. Small cell base stations are provided as well to provide additional coverage areas. Small cell base stations are typically coupled to an Internet backend (e.g., at a residence, office building, etc.) and provide a frontend radio access network (RAN) interface. Transceivers for the small cell base stations are typically calibrated for in-phase/quadrature phase (I/Q) imbalance in the laboratory or factory where the small cell base stations are tested or manufactured. Performing calibration in the laboratory or factory, however, fails to consider time-varying device performance due to environmental factors of the deployment location of the small cell base station (e.g., temperature variations, part-to-part variations, component degradation, etc.).

To assist in adjusting the calibration for different operating environments, certain measurable parameters can be defined for determining corresponding calibration variables for the transceivers, such as an offset to apply to the transmitter and/or receiver local oscillator to account for certain conditions that may be predicted based on the measurable parameters. Even in this case, however, it is impossible to define variables for all operating environments, and thus the calibration may not be as accurate in the deployed location of the small cell base station as defined in the laboratory/factory (e.g., off-air) calibration.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for calibrating transceiver impairment in wireless communications is provided. The method includes modifying, using one or more configured direct current (DC) components, DC components of one or more signals for transmitting to a user equipment (UE) via a transmitter, and receiving, by a receiver, the one or more signals as transmitted via the transmitter. The method further includes determining an impairment of at least one of the transmitter, the receiver, or a combination thereof, based at least in part on comparing the DC components of the one or more signals as received via the receiver to the one or more configured DC components, and adjusting one or more components of at least one of the transmitter, the receiver, or a combination thereof to compensate for the impairment.

In other aspects, an apparatus for calibrating transceiver impairment in wireless communications is provided. The apparatus includes the RF transceiver comprising a receiver and a transmitter, at least one processor communicatively coupled with the RF transceiver via a bus for communicating signals in a wireless network, and a memory communicatively coupled with the at least one processor and/or the RF transceiver via the bus. The at least one processor is operable to modify, using one or more configured direct current (DC) components, DC components of one or more signals for transmitting to a user equipment (UE) via the transmitter, receive, by the receiver, the one or more signals as transmitted via the transmitter, determine an impairment of at least one of the transmitter, the receiver, or a combination thereof, based at least in part on comparing the DC components of the one or more signals as received via the receiver to the one or more configured DC components, and adjust one or more components of at least one of the transmitter, the receiver, or a combination thereof to compensate for the impairment.

In another example, an apparatus for calibrating transceiver impairment in wireless communications is provided. The apparatus includes means for modifying, using one or more configured direct current (DC) components, DC components of one or more signals for transmitting to a user equipment (UE) via a transmitter, and means for receiving, via a receiver, the one or more signals as transmitted via the transmitter. The apparatus also includes means for determining an impairment of at least one of the transmitter, the receiver, or a combination thereof, based at least in part on comparing the DC components of the one or more signals as received via the receiver to the one or more configured DC components, and means for adjusting one or more components of at least one of the transmitter, the receiver, or a combination thereof to compensate for the impairment.

In other aspects, a computer-readable storage medium comprising computer-executable code for calibrating transceiver impairment in wireless communications is provided. The code includes code for modifying, using one or more configured direct current (DC) components, DC components of one or more signals for transmitting to a user equipment (UE) via a transmitter, and code for receiving, via a receiver, the one or more signals as transmitted via the transmitter. The code further includes code for determining an impairment of at least one of the transmitter, the receiver, or a combination thereof, based at least in part on comparing the DC components of the one or more signals as received via the receiver to the one or more configured DC components, and code for adjusting one or more components of at least one of the transmitter, the receiver, or a combination thereof to compensate for the impairment.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
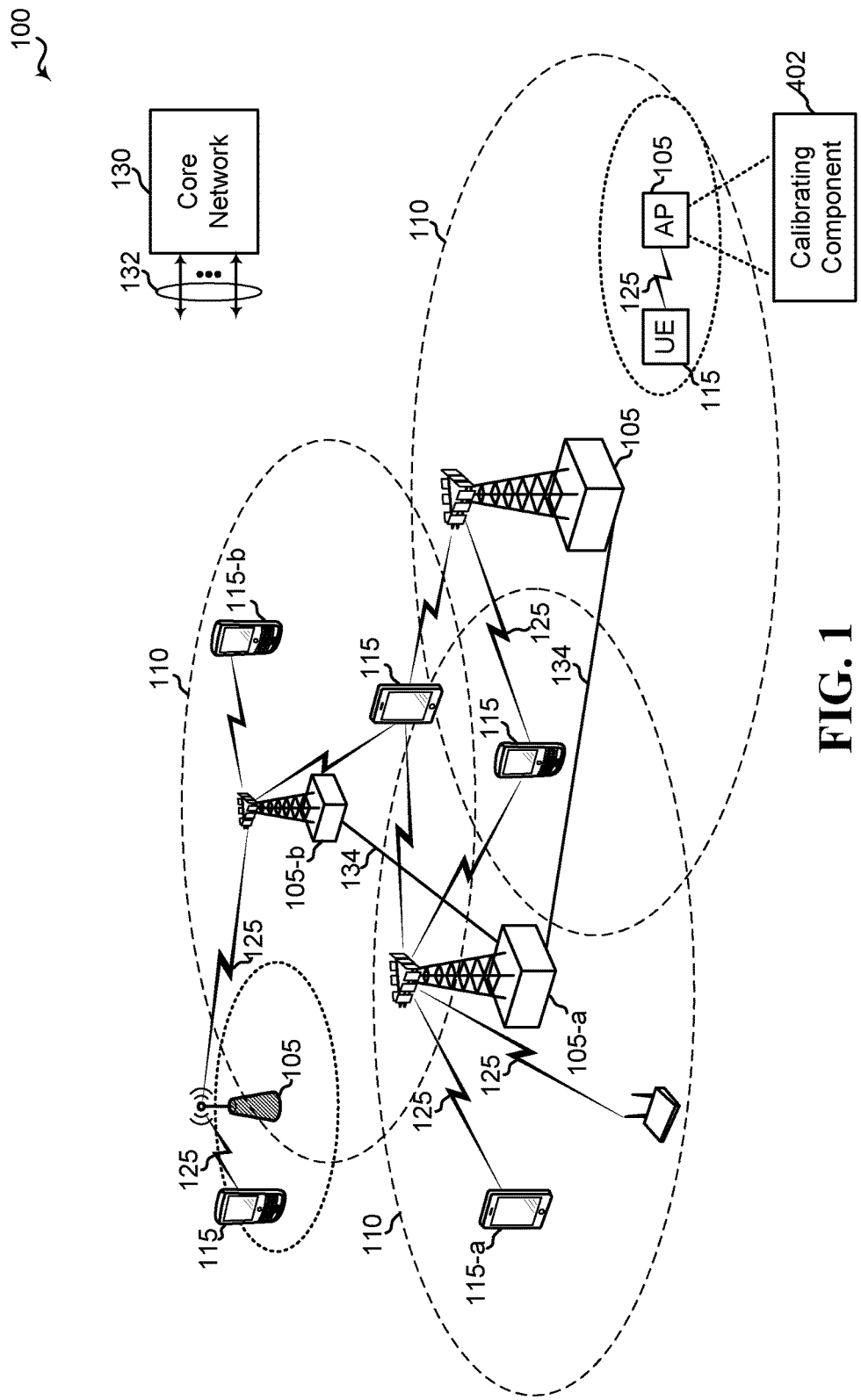
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Described herein are various aspects related to on-air self-calibration of wireless devices. For example, the devices can perform a self-calibration of a radio frequency (RF) transceiver based on signals that may be transmitted by the device to other devices in normal wireless communications (e.g., on-air signals, also referred to as mission signals). In an example, the device may introduce non-intrusive additive points to the signals for subsequent detection thereof in the transmitted signal to determine an impairment in a transmitter and/or receiver of the RF transceiver. In one example, the device may modify direct current (DC) components of the signals with known DC components, transmit the signals (e.g., to other devices), and compare DC components of the signals as received with the known DC components to determine the impairment. For example, a DC component may refer to a DC bias, a DC voltage/current, a DC offset, or a DC coefficient that may be part of a signal or waveform. The device may accordingly adjust one or more parameters of the RF transceiver to correct the impairment. In one aspect, the device may adjust a digital baseband input to a digital-to-analog converter (DAC), adjusting signals output from the DAC in the analog domain, adjust a local oscillator, etc. (e.g., of the transmitter and/or receiver or other transmitter/receivers) to compensate for the impairment. For example, the transceiver impairment may include a mismatch between in-phase (I) and quadrature phase (Q) branches of the transceiver, a DC offset (DCOC) that may cause signal leakage from the transceiver, etc.

Some calibration schemes have used separate out-of-band training signals that are transmitted by the device and evaluated as feedback for adjusting RF front end components. These out-of-band signals, however, may violate out-of-band emissions requirements, and may consume additional resources to transmit the separate training signals. One or more aspects described herein, however, can include modifying mission signals, and thus may not require separate training signals, much less out-of-band signals. Moreover, modifying on-air signals (e.g., signals used to communicate data in a wireless network), as described herein, may be used with substantially any RF design (e.g., a digital pre-distortion (DPD) feedback branch, or otherwise), may be used without receiver feedback impairment calibration, may be used with most of the physical layer software building blocks of a receiver design, may be non-iterative, may be radio access technology independent, etc.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a calibrating component 402 configured to perform self-calibration of an RF transceiver of the access point 105 and/or related RF front end components.

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, femto, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may be provided by small cell base stations as low power nodes or LPNs. A macro cell may generally cover a relatively large geographic area (e.g., several kilometers in radius) and may allow unrestricted access by UEs 115 with service subscriptions with the network provider. A small cell may generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, small cell eNBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of one or more hierarchical layers which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity (e.g., CA with each of one or more access points 105) or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

Each of the different operating modes that may be employed by wireless communications system 100 may operate according to frequency division duplexing (FDD) or time division duplexing (TDD). In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions.

As described herein, an access point 105 with a calibrating component 402 can self-calibrate an RF transceiver based at least in part on introducing one or more known measurable additive points in one or more signals transmitted to a UE 115 and comparing the known points to points determined from the one or more signals as received by the access point 105 (e.g., in a feedback or other receiver). Thus, the RF transceiver can be calibrated in the operating environment of the access point 105, and without expending resources (and/or potentially violating band emissions requirements) that may result in using specific calibration signals. Though aspects are described herein generally in terms of techniques for self-calibration of small cell base station, such as access point 105, similar techniques may be applied to RF transceivers of other devices used for wireless communications.

Figure 2:
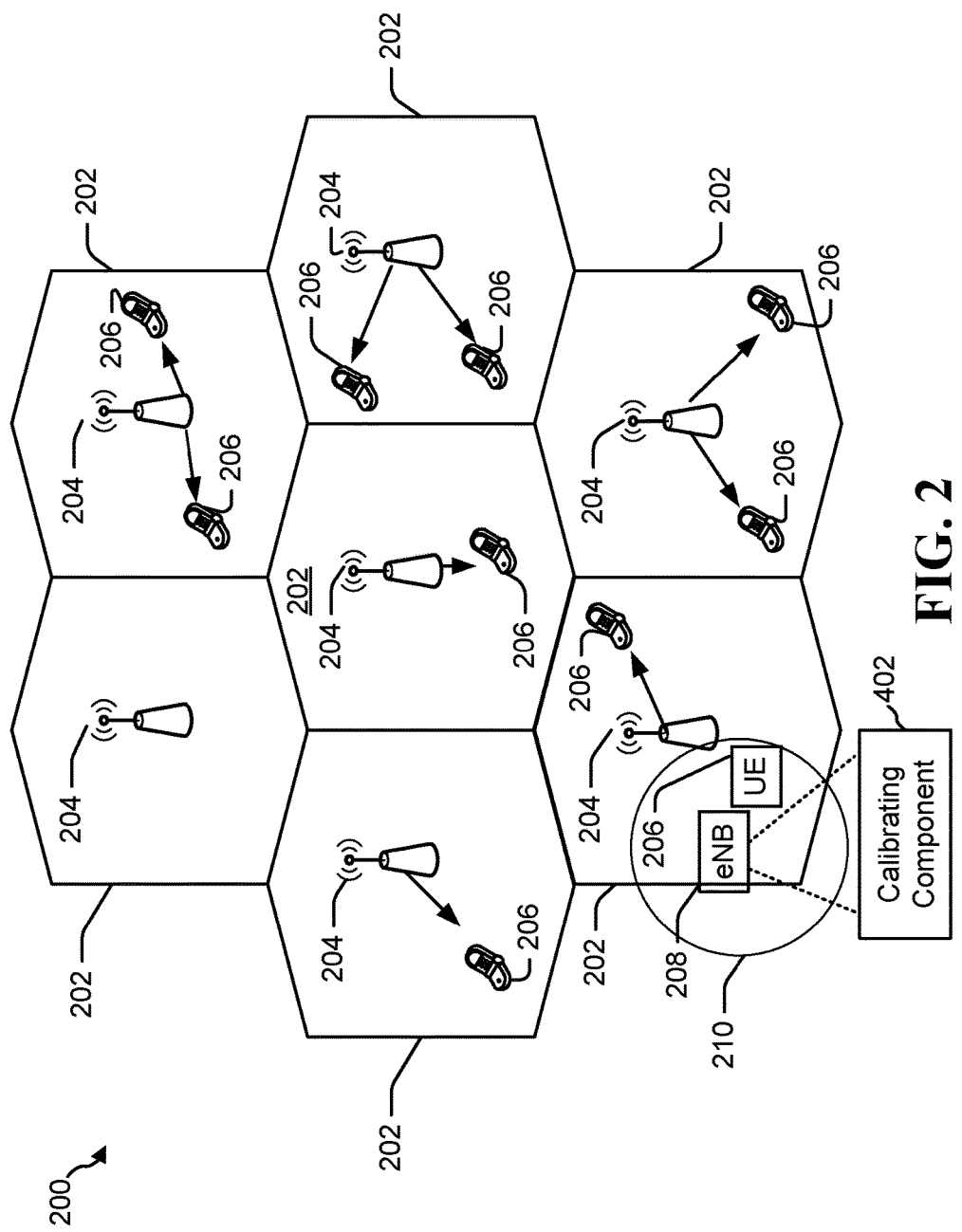
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more small cell eNBs 208 (e.g., eNBs of a lower power class than eNBs 204) may have cellular regions 210 that overlap with one or more of the cells 202. The small cell eNB 208 may be a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. One or more of the eNBs 204 or small cell eNBs 208 can include a calibrating component 402 configured to perform self-calibration of an RF transceiver of the eNB and/or related RF front end components. In addition, for example there is no centralized controller shown in this example of an access network 200, but a centralized controller may be used in alternative configurations. The eNBs 204 are responsible for all radio related functions including radio bearer control, admission control, mobility control, scheduling, security, and connectivity to a serving gateway (not shown).

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or transmitted to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
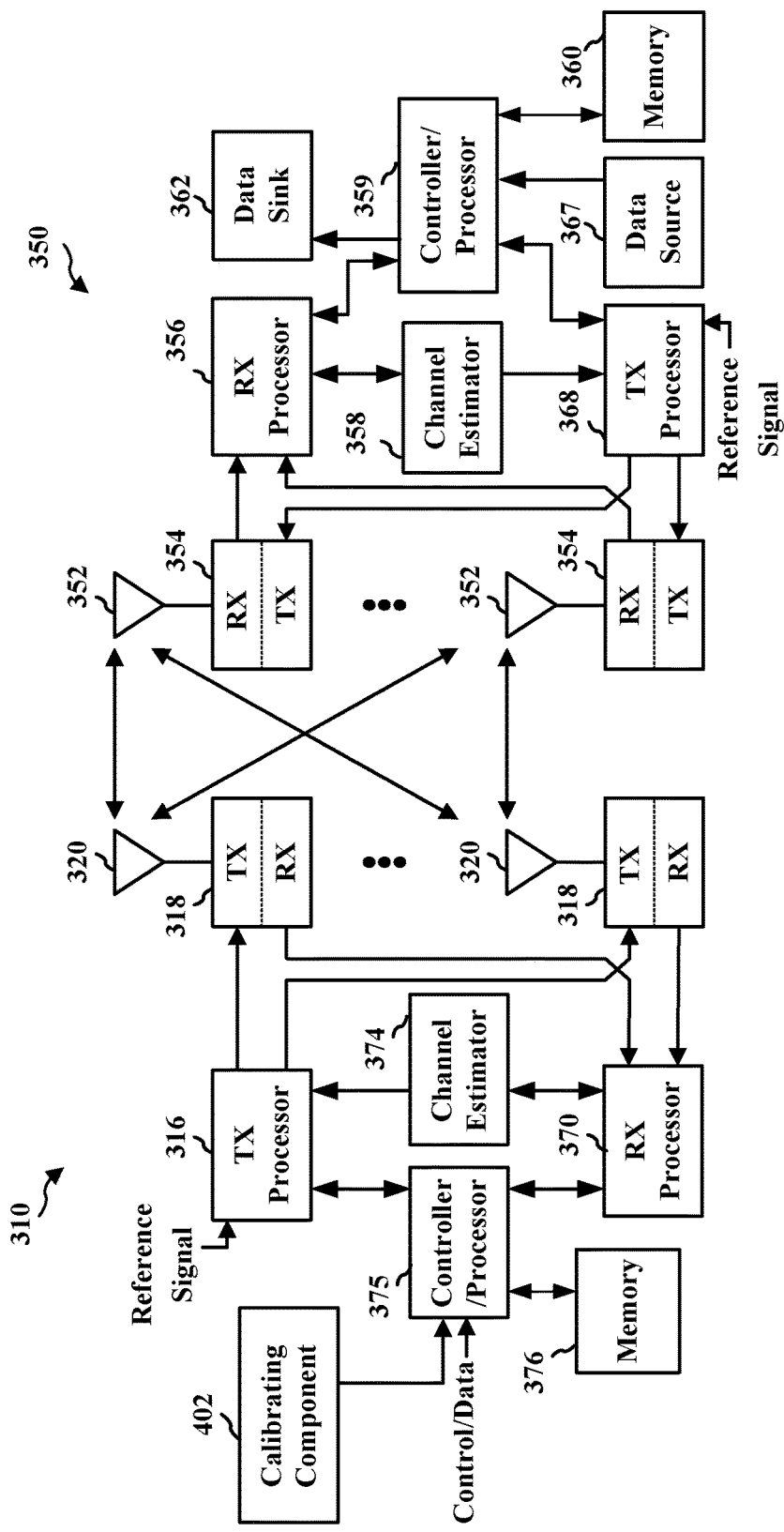
FIG. 3 is a diagram illustrating an example of an evolved Node B and user equipment in an access network.

FIG. 3 is a block diagram of an eNB 310 (e.g., access point 105, eNB 204, small cell eNB 208, eNB 440, eNB 450, eNB 460, etc.) in communication with a UE 350 (e.g., UE 115, 206, etc.) in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, eNB 310 may include a calibrating component 402 configured to perform self-calibration of an RF transceiver of the eNB, e.g., of TX processor 316, TX/RX 318, RX processor 370, or related RF front end components. For example, calibrating component 402 can be implemented and/or executed by one or more processors, such as TX processor 316, RX processor 370, controller/processor 375, etc.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
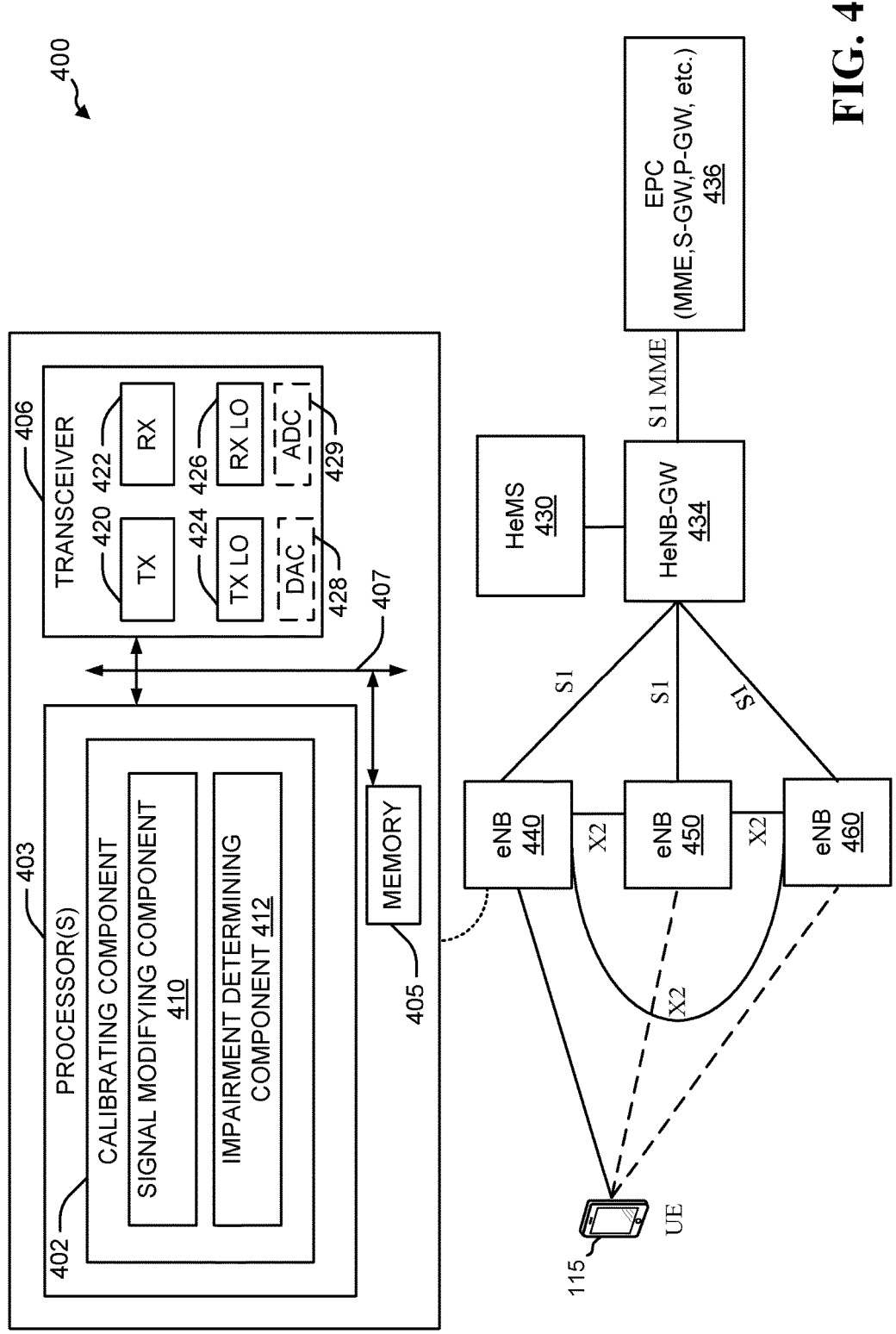
FIG. 4 is a diagram illustrating an example system for calibrating a transceiver in accordance with aspects described herein.
Figure 5:
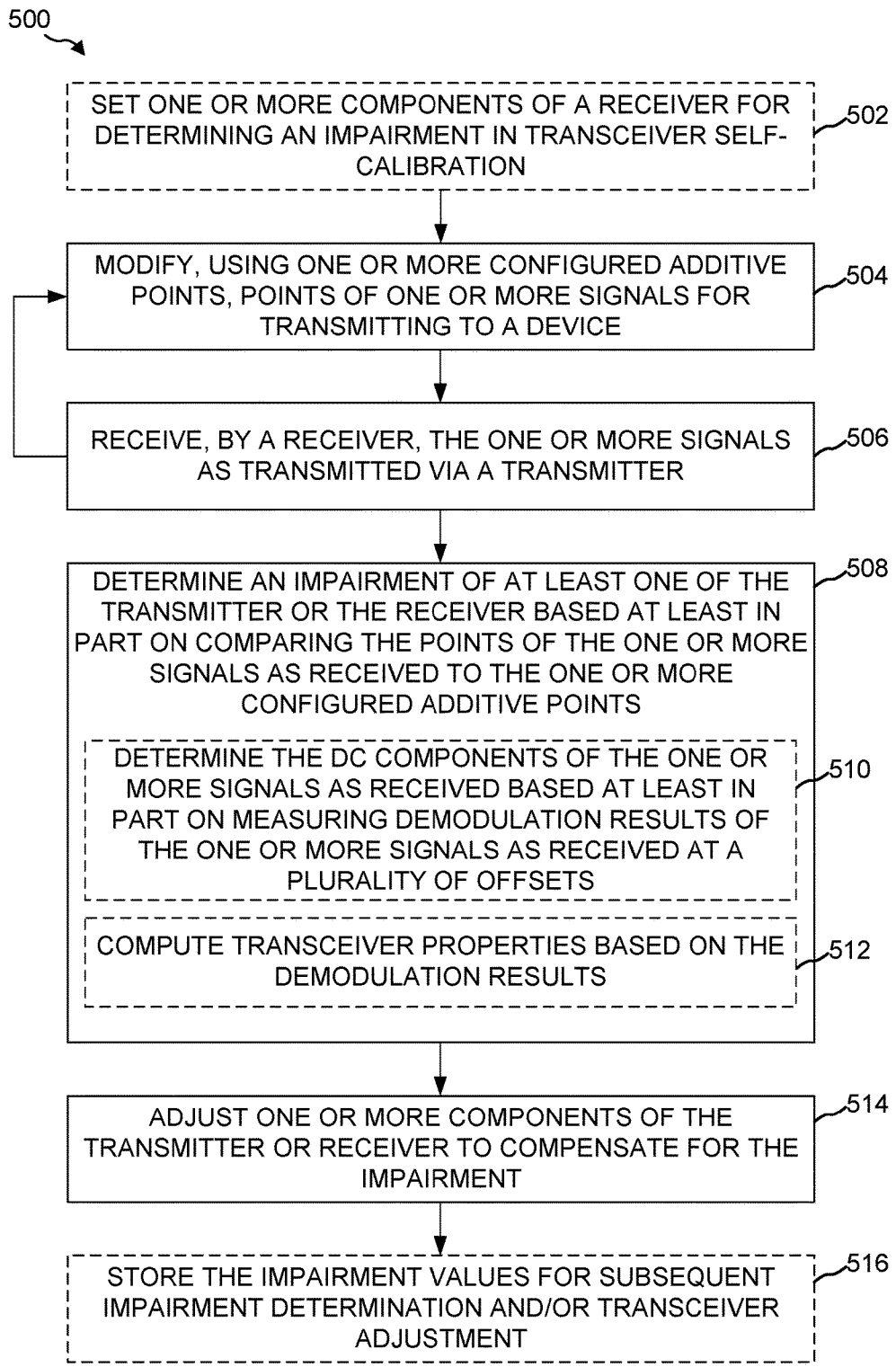
FIG. 5 is a flow chart of an example method of calibrating a transceiver in accordance with aspects described herein.

Referring to FIGS. 4-8, aspects are depicted with reference to one or more components and one or more methods that may perform the actions or functions described herein. In an aspect, the term "component" as used herein to refer to components of an eNB 440 may be one of the parts that make up a system, may be hardware or software or some combination thereof, and may be divided into other components. Although the operations described below in FIG. 5 is presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 4 is a block diagram conceptually illustrating an example of a network architecture 400, in accordance with aspects described herein. The network architecture 400 may be part of the wireless communications system 100 of FIG. 1, and may include a home eNB management system (HeMS) 430 capable of handling operation, administration, and management (OAM) of small cell base stations in a home network. The network architecture 400 may also include a home eNB gateway (HeNB-GW) 434, an evolved packet core (EPC) 436 (e.g., a core network, such as core network 130), and one or more eNBs 440, 450, 460. The eNBs 440, 450, 460 may be in communication with the HeNB-GW 434 via backhaul interfaces (e.g., an S1 interface). In an additional or an optional aspect, the eNBs 440, 450, 460 may communicate directly with EPC 436 via S1 interface. UE 115 can be in communication with one or more of eNBs 440, 450, 460. Additionally, the eNBs 440, 450, 460 may communicate with one another over backhaul interfaces (e.g., X2 interfaces). The HeNB-GW 434 and the EPC 436 may communicate via an S1 mobility management entity (MME) interface. The eNBs of FIG. 4 may correspond to one or more of the access points/eNBs described above with respect to FIGS. 1-3.

In an aspect, one or more of the eNBs 440, 450, 460 (though shown and described with respect to eNBs 440 only for ease of explanation) may be configured to perform self-calibration according to aspects described herein. Accordingly, eNBs 440 may include one or more processors 403 and/or a memory 405 that may be communicatively coupled, e.g., via one or more buses 407, and may operate in conjunction with or otherwise implement a calibrating component 402 configured to perform self-calibration of transceiver 406 of the eNB 440 and/or related RF front end components. For example, the various operations related to calibrating component 402 may be implemented or otherwise executed by one or more processors 403 and, in an aspect, can be executed by a single processor, while in other aspects, different ones of the operations may be executed by a combination of two or more different processors. For example, in an aspect, the one or more processors 403 may include any one or any combination of a modem processor, or a baseband processor, or a digital signal processor, or an application specific integrated circuit (ASIC), or a transmit processor, receive processor, or a transceiver processor associated with transceiver 406.

Further, for example, the memory 405 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 403. Moreover, memory 405 or computer-readable storage medium may be resident in the one or more processors 403, external to the one or more processors 403, distributed across multiple entities including the one or more processors 403, etc.

In addition, transceiver 406 may include one or more RF front end components, such as a TX 420 (and/or related processor), a RX 422 (and/or related processor), a TX LO 424 for centering or adjusting the TX 420 over a baseband frequency for transmitting one or more signals over a TX bandwidth, and a RX LO 426 for centering or adjusting the RX 422 over a baseband frequency for receiving one or more signals over a RX bandwidth. Transceiver 406 may also optionally include a DAC 428 for converting digital signals to analog signals for transmitting from the eNB 440, an analog-to-digital convertor (ADC) 429 for converting analog signals received at eNB 440 to digital signals for processing, and/or other RF front end components, in accordance with aspects described herein.

In particular, the one or more processors 403 and/or memory 405 may execute actions or operations defined by calibrating component 402 or its subcomponents. For instance, the one or more processors 403 and/or memory 405 may execute actions or operations defined by a signal modifying component 410 for modifying one or more aspects of one or more signals based on measurable additive points to facilitate subsequent detection of the points. In an aspect, for example, signal modifying component 410 may include hardware (e.g., one or more processor modules of the one or more processors 403) and/or computer-readable code or instructions stored in memory 405 and executable by at least one of the one or more processors 403 to perform the specially configured signal modifying operations described herein. Further, for instance, the one or more processors 403 and/or memory 405 may execute actions or operations defined by an impairment determining component 412 for determining an impairment from the one or more signals as received based on comparing additive points in the one or more signals as received to the known additive points. In an aspect, for example, impairment determining component 412 may include hardware (e.g., one or more processor modules of the one or more processors 403) and/or computer-readable code or instructions stored in memory 405 and executable by at least one of the one or more processors 403 to perform the specially configured impairment determining operations described herein.

It is to be appreciated that transceiver 406 may be configured to transmit and receive wireless signals through one or more antennas, an RF front end (e.g., including TX LO 424, RX LO 426, DAC 428, ADC 429, etc.), one or more transmitters, and one or more receivers. In an aspect, transceiver 406 may be tuned to operate at specified frequencies such that eNB 440 can communicate at a certain frequency. In an aspect, the one or more processors 403 may configure transceiver 406 to operate at a specified frequency and power level based on a configuration, a communication protocol, etc. to communicate uplink signals and/or downlink signals, respectively, over related uplink or downlink communication channels.

In an aspect, transceiver 406 can operate in multiple bands (e.g., using a multiband-multimode modem, not shown) such to process digital data sent and received using transceiver 406. In an aspect, transceiver 406 can be multiband and be configured to support multiple frequency bands for a specific communications protocol. In an aspect, transceiver 406 can be configured to support multiple operating networks and communications protocols. Thus, for example, transceiver 406 may enable transmission and/or reception of signals based on a specified modem configuration.

FIG. 5 illustrates an example method 500 for performing self-calibration of an RF transceiver of a device (e.g., an eNB). Method 500 can optionally include, at Block 502, setting one or more components of a receiver for determining an impairment in transceiver self-calibration. In an aspect, calibrating component 402, e.g., in conjunction with processor(s) 403, memory 405, and/or transceiver 406, can set the one or more components of the receiver (e.g., RX LO 426 or other RF front end components of RX 422 and/or another RX, such as a dedicated feedback RX) for determining an impairment in transceiver self-calibration. For example, calibrating component 402 may set a phase locked loop (PLL), baseband frequency, gain, etc. of the RX 422 for measuring signals in self-calibration of transceiver 406. In this regard, for example, LO frequency (e.g., of RX LO 426) may change based on change in PLL frequency such to offset the RX LO 426 with respect to TX LO 424, which allows impairments of the RX 422 and TX 420 to fall out of band without contaminating one another, as described further below with respect to FIG. 6. In addition, for example, calibrating component 402 may set a numerically control oscillator (NCO) of the RX 422, such as RX LO 426, according to a frequency difference between the RX 422 and TX 420. Further, for example, calibrating component 402 may mute a Q branch of the RX 422 (e.g., set the Q branch to zero) and/or set digital front end (DFE) management of the RX 422 to process signals for self-calibration. This can assist, for example, in determining I branch characteristics of the RX 422. An example is depicted in FIG. 6, which illustrates example signals 600 transmitted and received by components of a device in accordance with aspects described herein.

Figure 6:
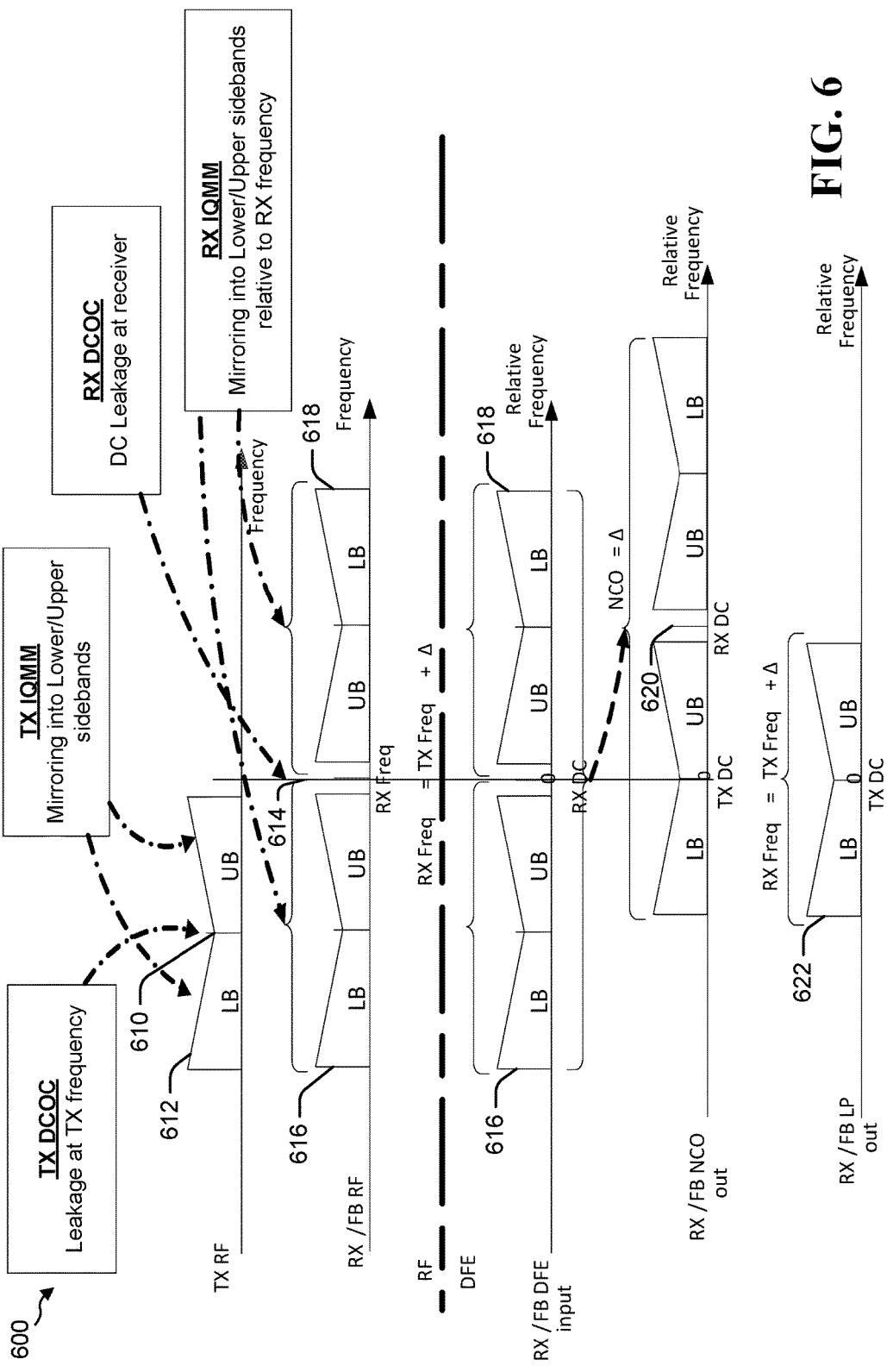
FIG. 6 is a diagram illustrating example signals transmitted and received by components of a device in accordance with aspects described herein.

In FIG. 6, a TX RF baseband (e.g., the baseband frequency of TX LO 424) can be centered at frequency 610 for transmitting signal 612 around the baseband frequency 610. The signal 612 can have DC offset (DCOC) causing signal leakage at the TX frequency, which causes transmitting unused power at the baseband frequency 610, possibly violating the signal mask and reducing efficiency of transmitter power. In addition, I/Q mismatch (IQMM) on the I/Q branches of the TX 420 may cause mirroring of the signal 612 into the UB and LB. In any case, calibrating component 402 can center the RX RF baseband (e.g., the baseband frequency of RX LO 426) at frequency 614, and can accordingly receive the signal 616 and another signal 618 that may be mirrored from signal 616 due to RX DCOC and/or IQMM, where the signal can be received by RX 422 RF and input to the digital front end (DFE) of the RX 422. In an example, to account for these impairments such to improve results of the self-calibration, calibrating component 402 can set the one or more components of the RX 422 at least in part by offsetting the RX RF baseband 620 (of the RX NCO—e.g., RX LO 426) by an offset Δ to from the TX RF baseband (e.g., at an edge of the channel bandwidth) to allow for cancelling the DCOC and/or IQMM from the received signal to obtain signal 622. Accordingly, for example, RX 422 can receive signal 622 as the signal 612 transmitted by TX 420, and can perform one or more operations on signal 622 to determine one or more impairments (e.g., IQMM and/or DCOC impairments) of the signal 622 to adjust one or more components of the transceiver 406, as described further herein.

In an example, method 500 may also include, at Block 504, modifying, using one or more configured additive points, points of one or more signals for transmitting to a device. In an aspect, signal modifying component 410, e.g., in conjunction with processor(s) 403, memory 405, and/or transceiver 406, can modify, using the one or more configured additive points, points of one or more signals for transmitting to the device (e.g., UE 115). The additive points may be non-intrusive to the one or more signals such that the device can still properly receive and/or decode the one or more signals. For example, signal modifying component 410 may modify one or more DC components of the one or more signals based on one or more known measurable additive DC components, which may be zero-frequency components having low power (e.g., around −5 to −30 decibels relative to carrier (dBc) for LTE) such that the device receiving the signals (e.g., UEs of high quadrature amplitude modulation (QAM) orders) may not notice the additive DC components. The low power used for the DC component may relate to, for example, a radio protocol used by the transceiver 406, a target quadrature amplitude modulation (QAM), etc. In an example, eNB 440 may know or otherwise determine the one or more DC components based on a configuration (e.g., stored at the eNB 440, received HeMS 430, HeNB-GW 434, one or more other components of EPC 436, etc., and/or the like).

Figure 7A:
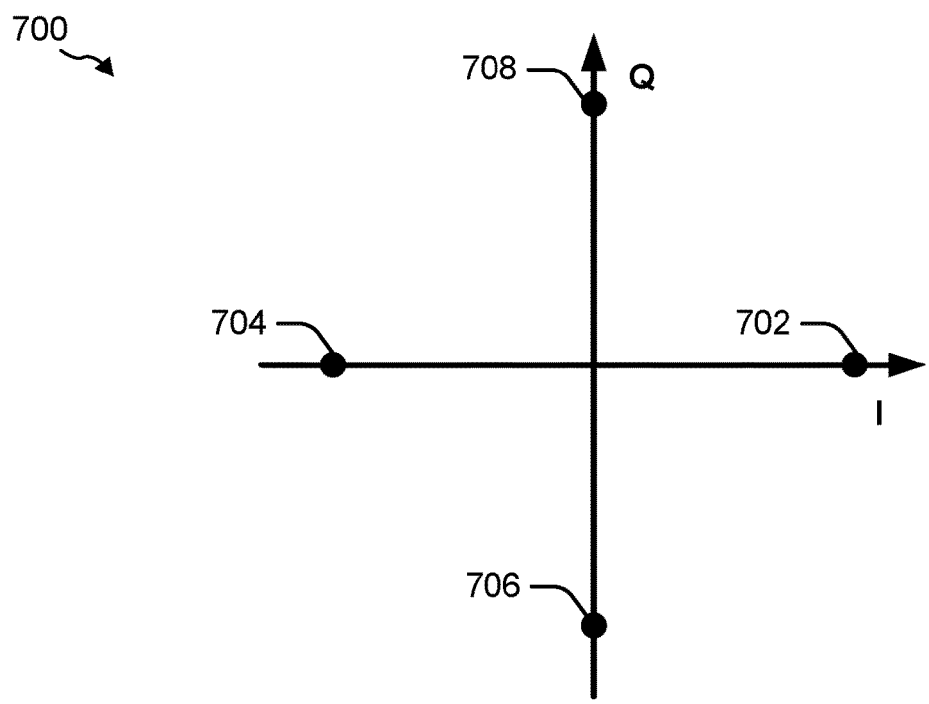
FIG. 7A is a diagram illustrating example additive points to a signal as transmitted in accordance with aspects described herein.

In one example, the one or more DC components can be added to the one or more signals at one or more points in an I/Q branch of TX 420. For example, as shown in FIG. 7A, the one or more DC components added to the one or more signals can correspond to point 702 along an I branch of an I/Q constellation 700 (1,0), point 704 along the I branch of the I/Q constellation 700 (−1,0), point 706 along a Q branch of the I/Q constellation 700 (0,−1), and/or point 708 along the Q branch of the I/Q constellation 700 (0,1). Thus, for example, signal modifying component 410 can add these points to the I/Q constellation 700 of the one or more signals as zero-frequency signals that are non-intrusive to the one or more signals. For example, transceiver 406 can transmit the signals having the additive DC components to the UE 115 (e.g., via TX 420) as mission mode control or data communications thereto; thus the signals transmitted by eNB 440 used to detect impairments do not need to be signals dedicated for self-calibration (and indeed such dedicated signals may otherwise violate out-of-band restrictions of a corresponding radio access technology or otherwise interfere with signals transmitted to UE 115, as described).

Figure 7B:
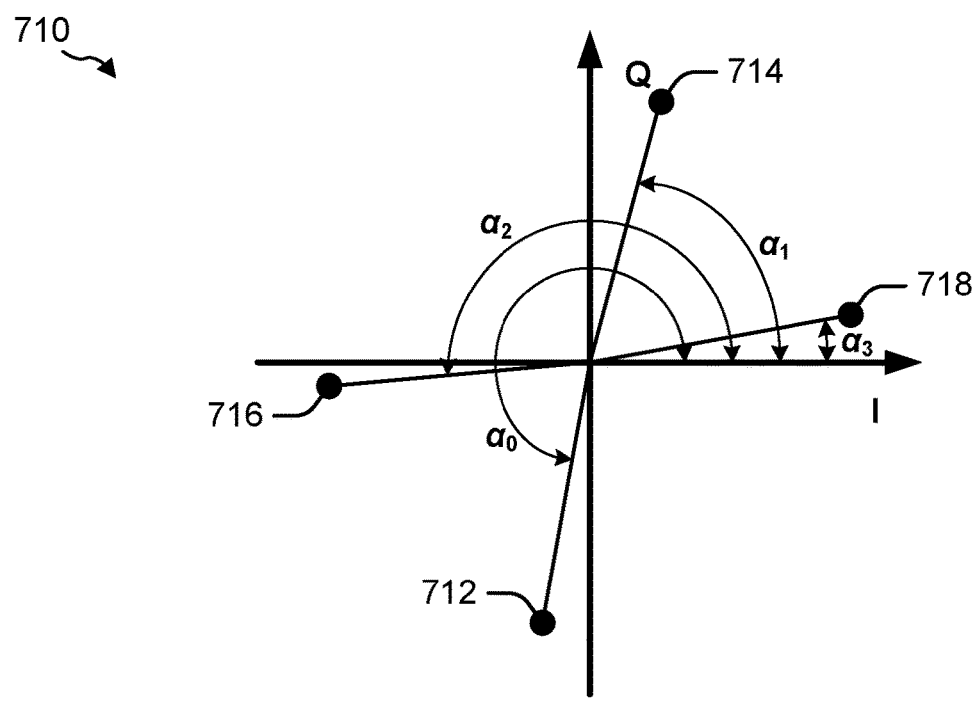
FIG. 7B is a diagram illustrating example additive points to a signal as received in accordance with aspects described herein.

In an example, method 500 may include, at Block 506, receiving, by a receiver, the one or more signals as transmitted via a transmitter. In an aspect, transceiver 406, e.g., in conjunction with processor(s) 403 and/or memory 405, may receive, by the receiver (e.g., RX 422), the one or more signals as transmitted via the transmitter (e.g., TX 420). RX 422 may function as a feedback RX in this regard. In an example, RX 422 may receive the signals having the DC components added by the calibrating component 402. For example, the DC components in the received signals may be offset by a phase difference. An example of DC components as received at an rotational phase offset is depicted in FIG. 7B at I/Q constellation 710. For example, point 702 can be received as point 712 in I/Q constellation 710 at a rotation $\alpha_0$, point 704 can be received as point 714 in I/Q constellation 710 at a rotation $\alpha_1$, point 706 can be received as point 716 in I/Q constellation 710 at a rotation $\alpha_2$, and point 708 can be received as point 718 in I/Q constellation 710 at a rotation $\alpha_3$.

For example, modifying the points of the one or more signals and receiving the signals may occur over multiple periods of time, and thus after Block 506, method 500 may proceed to Block 504 for one or more iterations. In this example, calibrating component 402 may modify one point of a signal (e.g., DC component at point 702) in one time period, and transceiver 406 can receive the signal with the modified DC component as the DC component at point 712. Then in a next time period, calibrating component 402 may modify one point of a signal (e.g., DC component at point 704) in one time period, and transceiver 406 can receive the signal with the modified DC component as the DC component at point 714, and so on, where the time periods can occur over a window of signal samples. In an example, the different time periods can have different phases (e.g., based on a residual frequency offset, which may be known by the transceiver 406 based on a frequency difference of a transmitted DC component and a received DC component). Thus, for example, impairment determining component 412 can de-rotate the measurements by the corresponding a value based on determining the initial arbitrary phase of the DC component as received and the residual frequency offset, as described further herein.

Method 500 can also include, at Block 508, determining an impairment of at least one of the transmitter or the receiver based at least in part on comparing the points of the one or more signals as received to the one or more configured additive points. In an aspect, impairment determining component 412, e.g., in conjunction with processor(s) 403 and/or memory 405, can determine the impairment of at least one of the transmitter (e.g., TX 420) or the receiver (e.g., RX 422) based at least in part on comparing the points of the one or more signals as received (e.g., the DC components of the one or more signals as received, such as points 712, 714, 716, 718) to the one or more configured additive points (e.g., the DC components as added to the one or more signals, such as point 702, 704, 706, 708).

For example, determining the impairment at Block 508 may optionally include, at Block 510, determining the DC components of the one or more signals as received based at least in part on measuring demodulation results of the one or more signals as received at a plurality of offsets. In an aspect, impairment determining component 412, e.g., in conjunction with processor(s) 403 and/or memory 405, can determine the DC components of the one or more signals as received based at least in part on measuring demodulation results of the one or more signals as received at the plurality of offsets. As described, for example, calibrating component 402 can set a DFE of TX 420 (e.g., TX LO 424) to an offset at an I branch and 0 at a Q branch (e.g., to insert a DC component at point 702) for transmitting a signal to UE 115. In this example, impairment determining component 412 may request RX demodulation results of the signal as received by RX 422 to determine DC component at point 712. Similarly, for example, calibrating component 402 can then set a DFE of TX 420 (e.g., TX LO 424) to a negative offset at an I branch and 0 at a Q branch (e.g., to insert a DC component at point 704) for transmitting a signal to UE 115. In this example, impairment determining component 412 may request RX demodulation results of the signal as received by RX 422 to determine DC component at point 714. Similarly, for example, calibrating component 402 can then set a DFE of TX 420 (e.g., TX LO 424) to 0 at an I branch and an offset at a Q branch (e.g., to insert a DC component at point 706) for transmitting a signal to UE 115. In this example, impairment determining component 412 may request RX demodulation results of the signal as received by RX 422 to determine DC component at point 716. Similarly, for example, calibrating component 402 can then set a DFE of TX 420 (e.g., TX LO 424) to 0 at an I branch and to a negative offset at a Q branch (e.g., to insert a DC component at point 708) for transmitting a signal to UE 115. In this example, impairment determining component 412 may request RX demodulation results of the signal as received by RX 422 to determine DC component at point 718. Moreover, in an example, calibrating component 402 can set a DFE of TX 420 (e.g., TX LO 424) to an offset at an I branch and 0 at a Q branch again for transmitting a signal to UE 115. In this example, impairment determining component 412 may request RX demodulation results of the signal as received by RX 422 to determine the associated DC component. In an example, impairment determining component 412 may compute a residual frequency error based on this last measurement and the first measurement of DC component at point 712.

In a specific example, where $x^{(tx)}$ represents a complex TX signal, $x_i^{(tx)}$ represents the I (Real) part, and $x_q^{(tx)}$ represents the Q (Imaginary) part, the modified DC components added by signal modifying component 410 can be represented as:

$x_i^{(tx)}$='S', $x_q^{(tx)}$='0'—added positive step, S, to 'I' axis, zero to 'Q' axis (e.g., point 702, where S=1), $x_i^{(tx)}$='-S', $x_q^{(tx)}$='0'—added negative step, -S, to 'I' axis, zero to 'Q' axis (e.g., point 704, where -S=-1), $x_i^{(tx)}$='0', $x_q^{(tx)}$='S'—added positive step, S, to 'Q' axis, zero to 'I' axis (e.g., point 706, where S=1), $x_i^{(tx)}$='0', $x_q^{(tx)}$='-S'—added negative step, -S, to 'Q' axis, zero to 'I' axis (e.g., point 708, where -S=-1).

Figure 8:
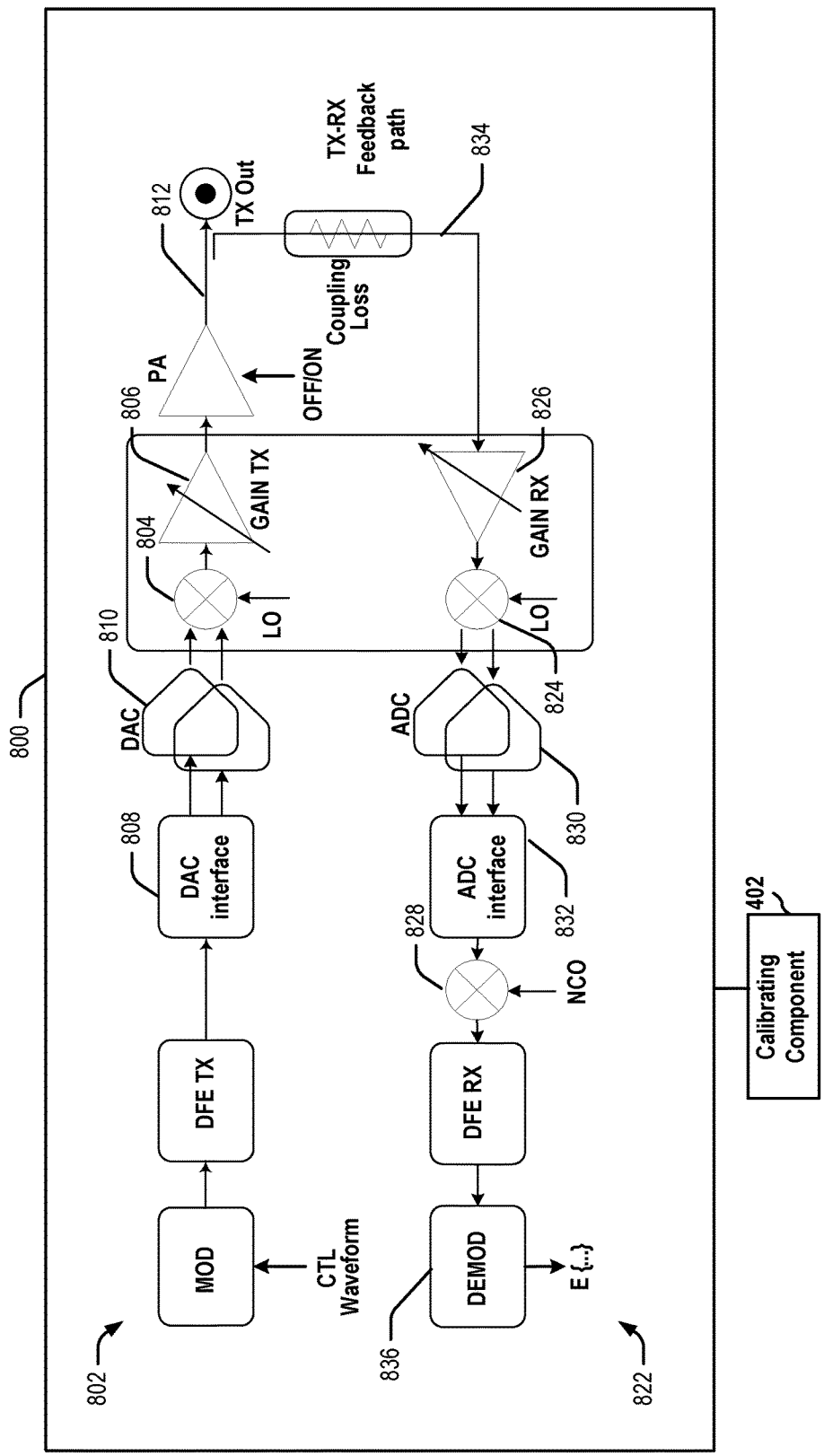
FIG. 8 is a diagram illustrating an example transceiver in accordance with aspects described herein.

In this example, impairment determining component 412 may then measure the demodulation results of the received signal independently on each axis as $E\{x_i^{(tx)}='S'\}$=C, $E\{x_q^{(tx)}='S'\}$=C, $E\{x_i^{(tx)}='-S'\}$=-C, $E\{x_q^{(tx)}='-S'\}$=-C, where C is the expected mean additive value of an axis (e.g., a chosen injected DC offset magnitude) to which the step S is added by calibrating component 402. In other notation, the demodulation results can correspond to, for example, $E^{(S,0)}\{dfe_i^{(rx)}\}$, which represents the mean of the received signal at the 'I' axis of the received samples (from RX 422—e.g., one or more frontend component thereof), based on the received signal having added DC component (S,0). In an example, the demodulation results may be based on a frequency offset of the TX 420 and/or RX 422, denoted $\omega_{tx}$, and $\omega_{rx}$, respectively, where $\omega_{tx}-\omega_{rx}=\Delta\omega_{rf}$. In this example, impairment determining component 412 can determine:

$$dfe_i^{(rx)} = \left[\frac{1}{2} \cdot G \cdot [(x_i^{(tx)} + dc_i^{(tx)}) \cdot (1 + g^{(tx)}) \cdot \cos(\Delta\omega_{rf}t) + (x_q^{(tx)} + dc_q^{(tx)}) \cdot \sin(\Delta\omega_{rf}t + \theta^{(tx)})]\right] \cdot \cos(\omega_{nco}t + \theta_{arb}),$$

$$dfe_q^{(rx)} = \left[\frac{1}{2} \cdot G \cdot [(x_i^{(tx)} + dc_i^{(tx)}) \cdot (1 + g^{(tx)}) \cdot \cos(\Delta\omega_{rf}t) + (x_q^{(tx)} + dc_q^{(tx)}) \cdot \sin(\Delta\omega_{rf}t + \theta^{(tx)})]\right] \cdot \sin(\omega_{nco}t + \theta_{arb}).$$

where $\omega_{nco}$ represents a frequency offset of an NCO of the RX 422 (e.g., NCO 828 in FIG. 8) and $\omega_{nco}t$ represents the related phase, $\theta_{arb}$ represents the arbitrary initial phase offset of the TX to RX feedback path which can include all involved RF components (e.g. from TX 802 to RX 822 in FIG. 8, as described further below) and the DFE receiver NCO (e.g., NCO 828) such that $\theta_{arb}$ can include arbitrary fixed phase and arbitrary varying phase (e.g., due to LOs 804, 824), $g^{(tx)}$ represents the additive I component gain prior to mixer operation for transmitting the signal, $\theta^{(tx)}$ represents Mixer phase error (e.g., where Mixer output=I cos($\omega_{tx}$t)+Q sin($\omega_{tx}$t+$\theta_{tx}$), where $\omega$ is the angular frequency, $\omega_{tx}t$ is the transmitter phase), $dc^{(tx)}$ represents an LO feedthrough parameter that can be calibrated prior to mixer operation, and thus $dc_i^{(tx)}$ represents the I (Real) part of the LO feedthrough parameter, and $dc_q^{(tx)}$ represents the Q (Imaginary) part of the the LO feedthrough parameter, and G represents an arbitrary path gain of the TX to RX feedback path (e.g. from TX 802 to RX 822 in FIG. 8). In any case, for example, impairment determining component 412 may perform measurements of each received signal having an added DC component on both of the I and Q branches. For example, impairment determining component 412 may perform the following measurements on the I branch:

$$E^{(S,0)}\{dfe_i^{(rx)}\} =$$
$$\frac{G}{4}\cdot[(C+dc_i^{(tx)})\cdot(1+g^{(tx)})\cdot\cos(-\theta_{arb})+(0+dc_q^{(tx)})\cdot\sin(\theta^{(tx)}-\theta_{arb})] =$$
$$\frac{G}{4}\cdot[(C+dc_i^{(tx)})\cdot(1+g^{(tx)})\cdot\cos(-\theta_{arb})+(+dc_q^{(tx)})\cdot\sin(\theta^{(tx)}-\theta_{arb})]$$

$$E^{(-S,0)}\{dfe_i^{(rx)}\} =$$
$$\frac{G}{4}\cdot[(-C+dc_i^{(tx)})\cdot(1+g^{(tx)})\cdot\cos(-\theta_{arb})+(0+dc_q^{(tx)})\cdot\sin(\theta^{(tx)}-\theta_{arb})] =$$
$$\frac{G}{4}\cdot[(-C+dc_i^{(tx)})\cdot(1+g^{(tx)})\cdot\cos(-\theta_{arb})+(dc_q^{(tx)})\cdot\sin(\theta^{(tx)}-\theta_{arb})]$$

$$E^{(S,0)}\{dfe_q^{(rx)}\} = \frac{G}{4}\cdot[-(C+dc_i^{(tx)})\cdot(1+g^{(tx)})\cdot\sin(-\theta_{arb})+$$
$$(0+dc_q^{(tx)})\cdot\cos(\theta^{(tx)}-\theta_{arb})] =$$
$$\frac{G}{4}\cdot[-(C+dc_i^{(tx)})\cdot(1+g^{(tx)})\cdot\sin(-\theta_{arb})+(dc_q^{(tx)})\cdot\cos(\theta^{(tx)}-\theta_{arb})]$$

$$E^{(-S,0)}\{dfe_q^{(rx)}\} = \frac{G}{4}\cdot[-(-C+dc_i^{(tx)})\cdot(1+g^{(tx)})\cdot\sin(-\theta_{arb})+$$
$$(0+dc_q^{(tx)})\cdot\cos(\theta^{(tx)}-\theta_{arb})] =$$
$$\frac{G}{4}\cdot[-(-C+dc_i^{(tx)})\cdot(1+g^{(tx)})\cdot\sin(-\theta_{arb})+(dc_q^{(tx)})\cdot\cos(\theta^{(tx)}-\theta_{arb})]$$

In addition, impairment determining component 412 may perform the following measurements on the Q branch:

$$E^{(0,S)}\{dfe_i^{(rx)}\} =$$
$$\frac{G}{4}\cdot[(0+dc_i^{(tx)})\cdot(1+g^{(tx)})\cdot\cos(-\theta_{arb})+(C+dc_q^{(tx)})\cdot\sin(\theta^{(tx)}-\theta_{arb})] =$$
$$\frac{G}{4}\cdot[(dc_i^{(tx)})\cdot(1+g^{(tx)})\cdot\cos(\theta_{arb})+(C+dc_q^{(tx)})\cdot\sin(\theta^{(tx)}-\theta_{arb})]$$

$$E^{(0,-S)}\{dfe_i^{(rx)}\} =$$
$$\frac{G}{4}\cdot[(0+dc_i^{(tx)})\cdot(1+g^{(tx)})\cdot\cos(-\theta_{arb})+(-C+dc_q^{(tx)})\cdot\sin(\theta^{(tx)}-\theta_{arb})] =$$
$$\frac{G}{4}\cdot[(dc_i^{(tx)})\cdot(1+g^{(tx)})\cdot\cos(\theta_{arb})+(-C+dc_q^{(tx)})\cdot\sin(\theta^{(tx)}-\theta_{arb})]$$

$$E^{(0,S)}\{dfe_q^{(rx)}\} =$$
$$\frac{G}{4}\cdot[-(0+dc_i^{(tx)})\cdot(1+g^{(tx)})\cdot\sin(-\theta_{arb})+(C+dc_q^{(tx)})\cdot\cos(\theta^{(tx)}-\theta_{arb})] =$$
$$\frac{G}{4}\cdot[(dc_i^{(tx)})\cdot(1+g^{(tx)})\cdot\sin(\theta_{arb})+(C+dc_q^{(tx)})\cdot\cos(\theta^{(tx)}-\theta_{arb})]$$

$$E^{(0,-S)}\{dfe_q^{(rx)}\} =$$
$$\frac{G}{4}\cdot[-(0+dc_i^{(tx)})\cdot(1+g^{(tx)})\cdot\sin(-\theta_{arb})+(-C+dc_q^{(tx)})\cdot\cos(\theta^{(tx)}-\theta_{arb})] =$$
$$\frac{G}{4}\cdot[(dc_i^{(tx)})\cdot(1+g^{(tx)})\cdot\sin(\theta_{arb})+(-C+dc_q^{(tx)})\cdot\cos(\theta^{(tx)}-\theta_{arb})]$$

In addition, determining the impairment at Block 508 may optionally include, at Block 512, computing transceiver properties based on the demodulation results. In an aspect, impairment determining component 412 may compute the transceiver properties based on the demodulation results. For example, based on the above demodulation results, impairment determining component 412 may compute transceiver properties, such as a difference between the mean value of opposite additive DC components. For example, impairment determining component 412 may compute:

$$E^{(S,0)}\{dfe_i^{(rx)}\} - E^{(-S,0)}\{dfe_i^{(rx)}\} = \frac{G}{4}\cdot 2C\cdot(1+g^{(tx)})\cdot\cos(-\theta_{arb})$$

$$W = \frac{G}{2}\cdot C\cdot(1+g^{(tx)})\cdot\cos(-\theta_{arb})$$

$$E^{(S,0)}\{dfe_q^{(rx)}\} - E^{(-S,0)}\{dfe_q^{(rx)}\} = -\frac{G}{4}\cdot 2C\cdot(1+g^{(tx)})\cdot\sin(-\theta_{arb})$$

$$X = \frac{G}{2}\cdot C\cdot(1+g^{(tx)})\cdot\sin(\theta_{arb})$$

$$E^{(0,S)}\{dfe_i^{(rx)}\} - E^{(0,-S)}\{dfe_i^{(rx)}\} =$$
$$\frac{G}{4}\cdot[(dc_i^{(tx)})\cdot(1+g^{(tx)})\cdot\cos(\theta_{arb})+(C+dc_q^{(tx)})\cdot\sin(\theta^{(tx)}-\theta_{arb})] -$$
$$\frac{G}{4}\cdot[(dc_i^{(tx)})\cdot(1+g^{(tx)})\cdot\cos(\theta_{arb})+(-C+dc_q^{(tx)})\cdot\sin(\theta^{(tx)}-\theta_{arb})]$$

$$Y = \frac{G}{4}\cdot 2C\cdot\sin(\theta^{(tx)}-\theta_{arb}) =$$
$$-\frac{G}{2}\cdot C\cdot\sin(\theta_{arb}-\theta^{(tx)}) = \frac{G}{2}\cdot C\cdot\cos(90+\theta_{arb}-\theta^{(tx)})$$

$$E^{(0,S)}\{dfe_q^{(rx)}\} - E^{(0,-S)}\{dfe_q^{(rx)}\} =$$
$$\frac{G}{4}\cdot[(dc_i^{(tx)})\cdot(1+g^{(tx)})\cdot\sin(\theta_{arb})+(C+dc_q^{(tx)})\cdot\cos(\theta^{(tx)}-\theta_{arb})] -$$
$$\frac{G}{4}\cdot[(dc_i^{(tx)})\cdot(1+g^{(tx)})\cdot\sin(\theta_{arb})+(-C+dc_q^{(tx)})\cdot\cos(\theta^{(tx)}-\theta_{arb})]$$

$$Z = \frac{G}{4}\cdot 2\cdot C\cdot\cos(\theta^{(tx)}-\theta_{arb}) =$$
$$\frac{G}{2}\cdot C\cdot\cos(\theta_{arb}-\theta^{(tx)}) = \frac{G}{2}\cdot C\cdot\sin(90+\theta_{arb}-\theta^{(tx)})$$

Based on these computations, for example, impairment determining component 412 may compute additional transceiver properties, such as an initial phase—e.g., $\theta_{arb}$=atan 2(W,X), a gain—e.g., $$G = \frac{2}{C}\cdot\sqrt{[(Y)^2+(Z)^2]},$$

etc. Accordingly, impairment determining component 412 may determine IQMM impairments based on the initial phase and/or gain, as $\theta^{(tx)}$=90+atan 2(W,X)−atan 2(Y,Z), and $$1+g^{(tx)} = \sqrt{\frac{(W)^2+(X)^2}{(Y)^2+(Z)^2}}.$$

In addition, impairment determining component 412 may compute the DCOC impairments using the initial phase and/or gain. For example, the DCOC impairments may be based on:

$$E^{(0,0)}\{dfe_i^{(rx)}\} = \frac{G}{4}\cdot(dc_i^{(tx)})\cdot(1+g^{(tx)})\cdot\cos(-\theta_{arb})+dc_q^{(tx)}\cdot\sin(\theta^{(tx)}-\theta_{arb}) =$$

-continued $$E^{(0,0)}(dfe_q^{(rx)}) = -\frac{G}{4} \cdot (dc_i^{(tx)}) \cdot (1 + g^{(tx)}) \cdot \cos(\theta_{arb}) + dc_q^{(tx)} \cdot \sin(\theta^{(tx)} - \theta_{arb})$$
$$= -\frac{G}{4} \cdot (dc_i^{(tx)}) \cdot (1 + g^{(tx)}) \cdot \sin(-\theta_{arb}) + dc_q^{(tx)} \cdot \cos(\theta^{(tx)} - \theta_{arb}) =$$
$$\frac{G}{4} \cdot (dc_i^{(tx)}) \cdot (1 + g^{(tx)}) \cdot \sin(\theta_{arb}) + dc_q^{(tx)} \cdot \cos(\theta^{(tx)} - \theta_{arb})$$

such that:

$$\begin{pmatrix} E^{(0,0)}(dfe_i^{(rx)}) \\ E^{(0,0)}(dfe_q^{(rx)}) \end{pmatrix} = \frac{G}{4} \cdot \begin{pmatrix} (1+g^{(tx)})\cos(\theta_{arb}) & \sin(\theta^{(tx)} - \theta_{arb}) \\ (1+g^{(tx)})\sin(\theta_{arb}) & \cos(\theta^{(tx)} - \theta_{arb}) \end{pmatrix} \cdot \begin{pmatrix} dc_i^{(tx)} \\ dc_q^{(tx)} \end{pmatrix}.$$

In this example, impairment determining component 412 can compute the DCOC impairments as:

$$\begin{pmatrix} dc_i^{(tx)} \\ dc_q^{(tx)} \end{pmatrix} = \frac{4}{G} \cdot \begin{pmatrix} (1+g^{(tx)}) \cdot \cos(\theta_{arb}) & \sin(\theta^{(tx)} - \theta_{arb}) \\ (1+g^{(tx)}) \cdot \sin(\theta_{arb}) & \cos(\theta^{(tx)} - \theta_{arb}) \end{pmatrix}^{-1} \cdot \begin{pmatrix} E^{(0,0)}(dfe_i^{(rx)}) \\ E^{(0,0)}(dfe_q^{(rx)}) \end{pmatrix}$$

$$\begin{pmatrix} dc_i^{(tx)} \\ dc_q^{(tx)} \end{pmatrix} =$$

$$\frac{4}{G} \cdot \frac{\begin{pmatrix} \cos(\theta^{(tx)} - \theta_{arb}) & -\sin(\theta^{(tx)} - \theta_{arb}) \\ -(1+g^{(tx)}) \cdot \sin(\theta_{arb}) & (1+g^{(tx)}) \cdot \cos(\theta_{arb}) \end{pmatrix}}{(1+g^{(tx)}) \cdot \cos(\theta^{(tx)})} \cdot \begin{pmatrix} E^{(0,0)}(dfe_i^{(rx)}) \\ E^{(0,0)}(dfe_q^{(rx)}) \end{pmatrix}$$

$$dc_i^{(tx)} = \frac{4}{G * (1 + g^{(tx)}) * \cos(\theta^{(tx)})} \cdot [E^{(0,0)}(dfe_i^{(rx)}) * \cos(\theta^{(tx)} - \theta_{arb}) -$$
$$E^{(0,0)}(dfe_q^{(rx)}) * \sin(\theta^{(tx)} - \theta_{arb})]$$

$$dc_q^{(tx)} = \frac{4}{G * \cos(\theta^{(tx)})} \cdot [-E^{(0,0)}(dfe_i^{(rx)}) * \sin(\theta_{arb}) + E^{(0,0)}(dfe_q^{(rx)}) * \cos(\theta_{arb})].$$

Method 500 may also include, at Block 514, adjusting one or more components of the transmitter or receiver to compensate for the impairment. In an aspect, calibrating component 402, e.g., in conjunction with processor(s) 403, memory 405, and/or transceiver 406, may adjust the one or more components of the transmitter or receiver (e.g., TX LO 424, RX LO 426, DAC 428, ADC 429, etc.) to compensate for the impairment (e.g., the determined IQMM or related phase, gain, etc., the determined DCOC, and/or the like). For example, calibrating component 402 can calibrate a gain mismatch of TX LO 424 based on the measured gain impairment ($g^{(tx)}$), the LO phase mismatch based on the measured phase impairment ($\theta^{(tx)}$), and/or the LO carrier leakage based on the measured ($dc_i^{(tx)}$, $dc_q^{(tx)}$). In another example, calibrating component 402 can adjust a phase imbalance of an LO (e.g., TX LO 424, RX LO 426, another LO, etc.) based on aligning sin/cos LO outputs in quad generators of the Lows and adjusting a DC offset in the LO by adjusting a duty-cycle of the LO. In another example, calibrating component 402 can numerically/digitally adjust I/Q signals at the DAC 428 (e.g., adjust a baseband input to the DAC 428) to compensate for the impairment (e.g., and/or adjust I/Q signals output from ADC 429). In another example, calibrating component 402 can adjust I/Q signals from the DAC 428 (e.g., adjust an analog baseband output from the DAC 428) to compensate for the impairment (e.g., and/or adjust I/Q signals in the analog baseband input into ADC 429).

In an example, calibrating component 402 may initiate the process (e.g., method 500) for determining and/or accounting IQMM impairments separately from determining and/or accounting for DCOC impairments, and/or may determine and/or account for IQMM impairments less often (e.g., in a slower loop) as DCOC impairments. Moreover, for example, calibrating component 402 may initiate the process (e.g., method 500) for determining and accounting for impairments during TX power ramping of eNB 440 (e.g., along with other self-calibration mechanisms). In another example, calibrating component 402 may change the DC level components during operation. Such an example is to initiate the process as an initial self-calibration (e.g., during TX power ramping) where signal modifying component 410 may use a higher power for the DC components (e.g., around −5 dBc for LTE), while signal modifying component 410 may use DC components with lower power (e.g., around −30 dBc for LTE) for adding to transmitted signals in subsequent processes.

Method 500 may also optionally include, at Block 516, storing the impairment values for subsequent impairment determination and/or transceiver adjustment. In an aspect, calibrating component 402 may store the impairment value (e.g., in memory 405) for subsequent impairment determination (e.g., by impairment determining component 412) and/or transceiver adjustment (e.g., by calibrating component 402). For example, where calibrating component 402 is performing the process (e.g., method 500) as an initial self-calibration (e.g., during TX power ramping), calibrating component 402 can register one or more of the impairment values (e.g., IQMM values, DCOC values, etc.) as golden values to use in subsequent processes. Thus, for example, in subsequent processes (e.g., of method 500), calibrating component 402 can determine IQMM, as described above, and determine DCOC based on the golden IQMM value instead. In addition, in an example, calibrating component 402 can store the newly determined IQMM value as the new golden IQMM value to be used in subsequent processes, and/or the determined DCOC value as the new golden DCOC.

FIG. 8 illustrates an example transceiver 800 in accordance with aspects described herein. For example, transceiver 406 may include one or more components of transceiver 800. In addition, a TX LO 804 and RX LO 824 are shown, which may correspond to TX LO 424 and RX LO 426, respectively, and a DAC interface 808/DAC 810 and ADC 830/ADC interface 832 are shown, which may correspond to DAC 428 and ADC 429, respectively. Transceiver 800 includes a transmitter branch 802 with various transmitter components, and a receiver branch 822 with various receiver components. Transmitter branch 802 may be used to transmit a signal 812, which can be received (e.g., with some coupling loss) as signal 834 fed back into the receiver branch 822. In accordance with aspects described herein, a calibrating component 402 (and/or components thereof, as described herein) can be coupled to transceiver 800 for communicating with one or more components thereof to introduce DC components into transmitted signals, measure DC components of received signals, and/or adjust the transmitter branch 802 and/or receiver branch 822 (e.g., by adjusting components thereof) based on an impairment determined from the DC components, as described herein.

In a specific example, calibrating component 402 can (e.g., via a signal modifying component 410) use a TX DAC interface 808 to introduce additive points to a signal to be transmitted (e.g., DC components at points 702, 704, 706, 708). Transmitter branch 802 can transmit this signal 812 with the additive point(s), as described, and receiver branch 822 can receive the signal as feedback. In this example, calibrating component 402 (e.g., via an impairment determining component 412) can receive demodulation results (e.g., from a demodulator 836), and can accordingly determine one or more impairments based on comparing the additive points as determined based on demodulation results of the signal as received to the known additive points introduced to the signal by TX DAC interface 808 before transmission thereof. Based on the impairments, which may include IQMM impairments (e.g., phase offset, gain, etc.) and/or DCOC impairments, calibrating component 402 may adjust one or more components of the transmitter branch 802 and/or receiver branch 822, such as a TX LO 804, TX gain amplifier 806, DAC interface 808/DAC 810, ADC 830/ADC interface 832, RX gain amplifier 826, NCO 828, etc., as described, to account for the impairment in subsequent transmission/reception of signals.

Figure 9:
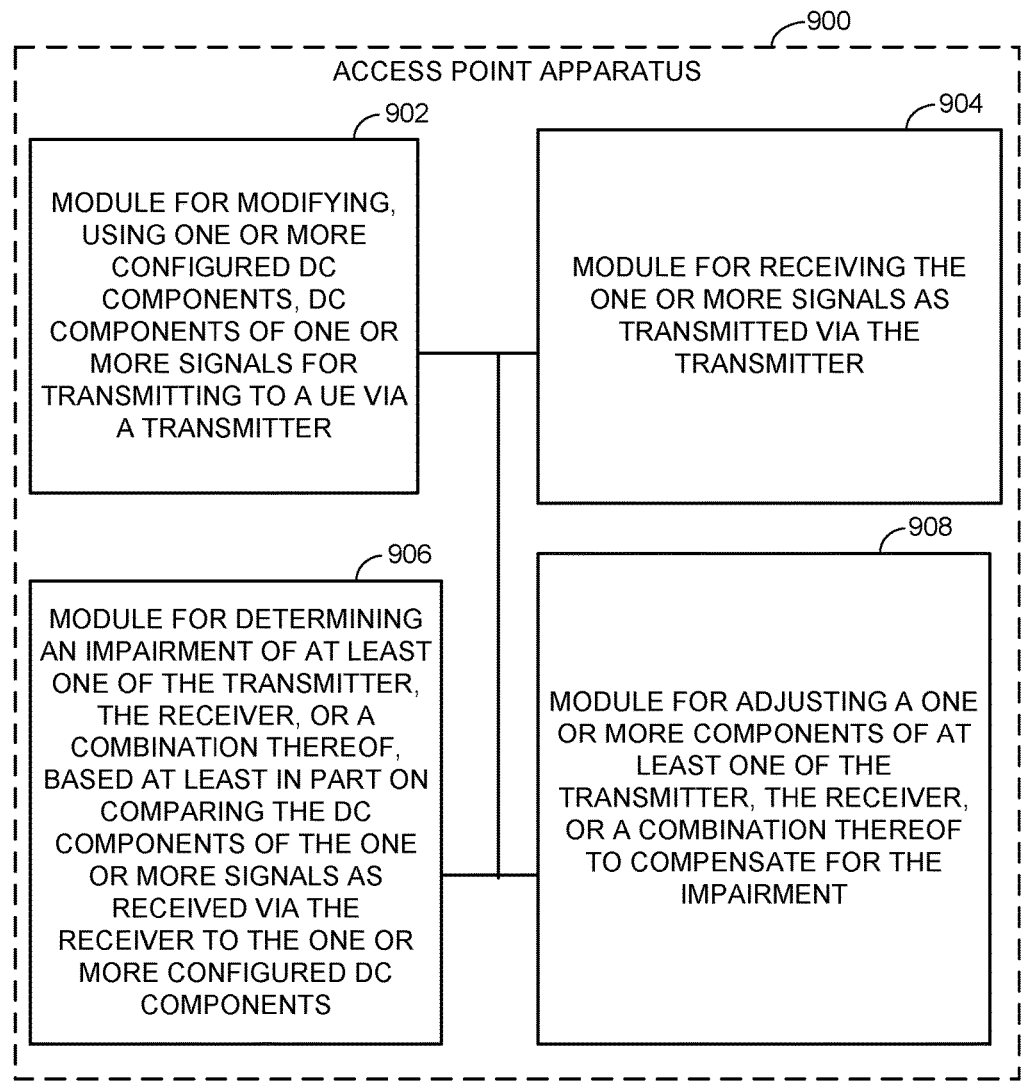
FIG. 9 is a block diagram of several sample aspects of apparatuses configured in accordance with aspects described herein.

FIG. 9 illustrates an example access point apparatus 900 represented as a series of interrelated functional modules. A module for modifying, using one or more configured DC components, DC components of one or more signals for transmitting to a UE via a transmitter 902 may correspond at least in some aspects to, for example, a processing system or communication device (e.g., a receiver, transceiver, etc.), as discussed herein. A module for receiving the one or more signals as transmitted via the transmitter 904 may correspond at least in some aspects to, for example, a processing system or communication device (e.g., a receiver, transceiver, etc.), as discussed herein. A module for determining an impairment of at least one of the transmitter, the receiver, or a combination thereof, based at least in part on comparing the DC components of the one or more signals as received via the receiver to the one or more configured DC components 906 may correspond at least in some aspects to, for example, a processing system or communication device (e.g., a receiver, transceiver, etc.), as discussed herein. A module for adjusting one or more components of at least one of the transmitter, the receiver, or a combination thereof to compensate for the impairment 908 may correspond at least in some aspects to, for example, a processing system or communication device (e.g., a receiver, transceiver, etc.), as discussed herein The functionality of the modules of FIG. 9 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module.

In addition, the components and functions represented by FIG. 9 as well as other components and functions described herein, may be implemented using any suitable means. Such means also may be implemented, at least in part, using corresponding structure as taught herein. For example, the components described above in conjunction with the "module for" components of FIG. 9 also may correspond to similarly designated "means for" functionality. Thus, in some aspects one or more of such means may be implemented using one or more of processor components, integrated circuits, or other suitable structure as taught herein.

It is understood that the specific order or hierarchy of steps in the processes disclosed is an illustration of example approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for calibrating transceiver impairment in wireless communications, comprising:
   modifying, using one or more configured direct current (DC) components, DC components of one or more signals for transmitting to a user equipment (UE) via a transmitter;
   receiving, by a receiver, the one or more signals as transmitted via the transmitter;
   determining an impairment of at least one of the transmitter, the receiver, or a combination thereof, based at least in part on comparing the DC components of the one or more signals as received via the receiver to the one or more configured DC components; and
   adjusting one or more components of at least one of the transmitter, the receiver, or a combination thereof to compensate for the impairment.

2. The method of claim 1, wherein determining the impairment further includes determining the DC components of the one or more signals as received via the receiver based at least in part on measuring demodulation results of the one or more signals as received at a plurality of offsets.

3. The method of claim 2, wherein the plurality of offsets correspond to a configured residual frequency offset of at least one of the transmitter, the receiver, and/or a combination thereof.

4. The method of claim 1, wherein determining the impairment is further based at least in part on one or more transceiver properties computed based at least in part on demodulation results of the one or more signals as received.

5. The method of claim 4, wherein determining the impairment further includes computing the one or more transceiver properties as at least one of a phase, a gain, or a combination thereof for at least one of the transmitter, the receiver, or a combination thereof.

6. The method of claim 5, wherein adjusting the one or more components of at least one of the transmitter, the receiver, or the combination thereof is based at least in part on at least one of the phase, the gain, or the combination thereof for at least one of the transmitter, the receiver, or the combination thereof.

7. The method of claim 1, further comprising setting one or more components of the receiver for determining the impairment as part of self-calibration.

8. The method of claim 7, wherein setting the one or more components of the receiver comprises offsetting a second local oscillator to separate another impairment in the one or more signals.

9. The method of claim 8, wherein offsetting the second local oscillator comprises offsetting a baseband of the second local oscillator to center the baseband at an edge of a channel bandwidth of the one or more signals.

10. The method of claim 1, wherein the one or more configured DC components are zero-frequency components.

11. The method of claim 1, wherein adjusting the one or more components of at least one of the transmitter, the receiver, or the combination thereof comprises adjusting a local oscillator, a digital-to-analog converter, or an analog-to-digital converter of at least one of the transmitter, the receiver, or the combination thereof.

12. An apparatus for calibrating transceiver impairment in wireless communications, comprising:
- a radio frequency (RF) transceiver comprising a receiver and a transmitter;
- at least one processor communicatively coupled with the RF transceiver via a bus for communicating signals in a wireless network; and
- a memory communicatively coupled with the at least one processor and/or the RF transceiver via the bus;
- wherein the at least one processor is operable to:
  - modify, using one or more configured direct current (DC) components, DC components of one or more signals for transmitting to a user equipment (UE) via the transmitter;
  - receive, by the receiver, the one or more signals as transmitted via the transmitter;
  - determine an impairment of at least one of the transmitter, the receiver, or a combination thereof, based at least in part on comparing the DC components of the one or more signals as received via the receiver to the one or more configured DC components; and
  - adjust one or more components of at least one of the transmitter, the receiver, or a combination thereof to compensate for the impairment.

13. The apparatus of claim 12, wherein the at least one processor is configured to determine the impairment by determining the DC components of the one or more signals as received via the receiver based at least in part on measuring demodulation results of the one or more signals as received at a plurality of offsets.

14. The apparatus of claim 13, wherein the plurality of offsets correspond to a configured residual frequency offset of at least one of the transmitter, the receiver, and/or a combination thereof.

15. The apparatus of claim 12, wherein the at least one processor is configured to determine the impairment based at least in part on one or more transceiver properties computed based at least in part on demodulation results of the one or more signals as received.

16. The apparatus of claim 15, wherein the at least one processor is configured to determine the impairment based at least in part on computing the one or more transceiver properties as at least one of a phase, a gain, or a combination thereof for at least one of the transmitter, the receiver, or a combination thereof.

17. The apparatus of claim 16, wherein the at least one processor is configured to adjust the one or more components of at least one of the transmitter, the receiver, or the combination thereof based at least in part on at least one of the phase, the gain, or the combination thereof for at least one of the transmitter, the receiver, or the combination thereof.

18. The apparatus of claim 12, wherein the at least one processor is further configured to set one or more components of the receiver for determining the impairment as part of self-calibration.

19. The apparatus of claim 18, wherein the at least one processor is configured to set the one or more components of the receiver at least in part by offsetting a second local oscillator to separate another impairment in the one or more signals.

20. The apparatus of claim 19, wherein the at least one processor is configured to determine offset the second local oscillator by offsetting a baseband of the second local oscillator to center the baseband at an edge of a channel bandwidth of the one or more signals.

21. The apparatus of claim 12, wherein the one or more configured DC components are zero-frequency components.

22. The apparatus of claim 12, wherein the at least one processor is configured to adjust the one or more components of at least one of the transmitter, the receiver, or the combination thereof at least in part by adjusting a local oscillator, a digital-to-analog converter, or an analog-to-digital converter of at least one of the transmitter, the receiver, or the combination thereof.

23. An apparatus for calibrating transceiver impairment in wireless communications, comprising:
- means for modifying, using one or more configured direct current (DC) components, DC components of one or more signals for transmitting to a user equipment (UE) via a transmitter;
- means for receiving, via a receiver, the one or more signals as transmitted via the transmitter;
- means for determining an impairment of at least one of the transmitter, the receiver, or a combination thereof, based at least in part on comparing the DC components of the one or more signals as received via the receiver to the one or more configured DC components; and
- means for adjusting one or more components of at least one of the transmitter, the receiver, or a combination thereof to compensate for the impairment.

24. The apparatus of claim 23, wherein the means for determining determines the impairment by determining the DC components of the one or more signals as received via the receiver based at least in part on measuring demodulation results of the one or more signals as received at a plurality of offsets.

25. The apparatus of claim 23, wherein the means for determining determines the impairment further based at least in part on one or more transceiver properties computed based at least in part on demodulation results of the one or more signals as received.

26. The apparatus of claim 23, further comprising means for setting one or more components of the receiver for determining the impairment as part of self-calibration.

27. A non-transitory computer-readable storage medium comprising computer-executable code for calibrating transceiver impairment in wireless communications, the code comprising:
  code for modifying, using one or more configured direct current (DC) components, DC components of one or more signals for transmitting to a user equipment (UE) via a transmitter;
  code for receiving, via a receiver, the one or more signals as transmitted via the transmitter;
  code for determining an impairment of at least one of the transmitter, the receiver, or a combination thereof, based at least in part on comparing the DC components of the one or more signals as received via the receiver to the one or more configured DC components; and
  code for adjusting one or more components of at least one of the transmitter, the receiver, or a combination thereof to compensate for the impairment.

28. The non-transitory computer-readable storage medium of claim 27, wherein the code for determining determines the impairment by determining the DC components of the one or more signals as received via the receiver based at least in part on measuring demodulation results of the one or more signals as received at a plurality of offsets.

29. The non-transitory computer-readable storage medium of claim 27, wherein the code for determining determines the impairment further based at least in part on one or more transceiver properties computed based at least in part on demodulation results of the one or more signals as received.

30. The non-transitory computer-readable storage medium of claim 27, further comprising code for setting one or more components of the receiver for determining the impairment as part of self-calibration.

* * * * *